(12) United States Patent
Modinger et al.

(10) Patent No.: US 9,707,924 B2
(45) Date of Patent: Jul. 18, 2017

(54) METHOD FOR MOUNTING A GAS GENERATOR, AND SUBASSEMBLY COMPRISING A GAS GENERATOR

(71) Applicant: TRW AUTOMOTIVE GMBH, Alfdorf (DE)

(72) Inventors: Thomas Modinger, Alfdorf (DE); Martin Nuding, Waldstetten (DE); Andreas Pregitzer, Ellwangen/Krassbronn (DE); Bernd Gentner, Ellwangen/Pfahlheim (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 15/106,857

(22) PCT Filed: Dec. 8, 2014

(86) PCT No.: PCT/EP2014/003282
§ 371 (c)(1),
(2) Date: Jun. 21, 2016

(87) PCT Pub. No.: WO2015/096887
PCT Pub. Date: Jul. 2, 2015

(65) Prior Publication Data
US 2017/0001596 A1     Jan. 5, 2017

(30) Foreign Application Priority Data
Dec. 23, 2013 (DE) ........................ 10 2013 114 849

(51) Int. Cl.
*B60R 22/46* (2006.01)

(52) U.S. Cl.
CPC .. *B60R 22/4628* (2013.01); *B60R 2022/4642* (2013.01)

(58) Field of Classification Search
CPC ................... B60R 22/4628; B60R 2022/4642
See application file for complete search history.

(56) References Cited

U.S. PATENT DOCUMENTS

| | | | | |
|---|---|---|---|---|
| 5,924,640 A * | 7/1999 | Hickey | ............... | B60R 22/4628 242/374 |
| 6,419,176 B1 * | 7/2002 | Mizuno | ............... | B60R 22/4628 242/374 |
| 2002/0040582 A1 | 4/2002 | Kameyoshi et al. | | |
| 2005/0151364 A1 | 7/2005 | Kameda et al. | | |
| 2006/0076762 A1 * | 4/2006 | Nakayasu | ............. | B60R 21/268 280/737 |
| 2013/0327873 A1 * | 12/2013 | Gentner | ............. | B60R 22/4628 242/374 |

FOREIGN PATENT DOCUMENTS

WO     2013156122     10/2013

* cited by examiner

*Primary Examiner* — Darlene P Condra
(74) *Attorney, Agent, or Firm* — Tarolli, Sundheim, Covell & Tummino LLP

(57) ABSTRACT

In the method for mounting an inflator (12) within a tube (14), especially of a belt tensioner, wherein an end portion (28) of the tube (14) is formed radially inwardly so that a first contact surface (30) directed to the interior of the tube (14) occurs, prior to forming an annular stabilizing disk (34) is arranged between the first contact surface (30) and a second contact surface (32) configured at the inflator (12).

10 Claims, 2 Drawing Sheets

METHOD FOR MOUNTING A GAS GENERATOR, AND SUBASSEMBLY COMPRISING A GAS GENERATOR

RELATED APPLICATIONS

This application corresponds to PCT/EP2014/003282, filed Dec. 8, 2014, which claims the benefit of German Application No. 10 2013 114 849.2, filed Dec. 23, 2013, the subject matter of which are incorporated herein by reference in their entireties.

BACKGROUND OF THE INVENTION

The invention relates to a method of mounting an inflator within a tube and a subassembly comprising an inflator mounted within a tube.

Inflators mounted at one end of a tube are used, for example, for driving a belt tensioner for a seat belt in an automotive vehicle.

In order to mount an inflator within a tube end it is known to insert the inflator into the tube end and to form the end portion of the tube radially inwardly so that the inflator is fixed inside the tube. Upon ignition of the inflator, in the case of unfavorable load the pressure generated by the outflowing gas may result in high force impact on the inwardly formed tube portion. The force distribution is not predictable when the inflator is mounted within the tube so that the pressure resistance of the mounting of the inflator within the tube has a broad variation in series production, which entails high rejects in the case of corresponding pressure resistance tests.

SUMMARY OF THE INVENTION

It is the object of the invention to improve the quality of the mounting of an inflator within a tube.

This is achieved by a method according to the invention for mounting an inflator within a tube, especially a tube of a belt tensioner, wherein an end portion of the tube is formed radially inwardly, for example by crimping, so that a first contact surface facing the interior of the tube occurs. Prior to forming an annular stabilizing disk is arranged between the first contact surface and a second contact surface configured at the inflator. The stabilizing disk absorbs compressive forces upon ignition of the inflator and causes a more even force distribution to the first contact surface at the tube so that part of the first contact surface can be reliably prevented from being bent open. On the one hand, this increases the maximum pressure resistance of the subassembly made of the tube and the inflator. On the other hand, the variation of the pressure resistance is definitely reduced in series production as compared to the conventional mounting method.

Preferably the inflator is inserted from the direction of the end portion into the tube, wherein a stop defining an axial position of the inflator within the tube is formed inside the tube. In this way the free length of the end portion which is formed inwardly is precisely defined. However, the insertion may also be optionally effectuated to fixed dimensions without the inflator being adjacent to the stop inside the tube. While the end portion is formed, the inflator then may move in the direction of the stop.

In a subassembly according to the invention comprising an inflator mounted within a tube, especially a tube of a belt tensioner, an annular stabilizing disk is arranged between the first contact surface at the radially inwardly formed end portion of the tube and the second contact surface at the inflator.

The first and/or second contact surfaces are preferably aligned substantially perpendicularly to a tube axis so that also the inflator is aligned along the axis of the tube.

In order to be capable of withstanding the forces acting upon ignition of the inflator without any excessive deformation the stabilizing disk advantageously consists of steel sheet.

The outer diameter of the stabilizing disk may amount to approximately between 10 and 25 mm, for example, while the inner diameter may be approximately 8 to 20 mm. A thickness of about 0.3 to 1 mm has proved to be suitable.

The inflator preferably is a micro-inflator. It may have, for example, a diameter of about 10 to 20 mm as well as a length of about 20 to 70 mm.

The second contact surface may be formed at a base of the inflator so that the inwardly formed end portion of the tube encompasses the base of the inflator in the area of the lower end thereof.

An outer diameter of the stabilizing disk is preferably slightly smaller than an outer diameter of the second contact surface. This permits to pre-mount the stabilizing disk on the inflator, for example by attaching, and to insert the two components jointly into the end portion of the tube, wherein the inflator can be seized on the outside of the base in the area of the second contact surface.

BRIEF DESCRIPTION OF THE DRAWINGS

The invention will be illustrated hereinafter by way of an embodiment with reference to the enclosed drawings, in which:

FIG. 1 illustrates a subassembly 10 made of an inflator 12 and a tube 14 in which the inflator 12 is inserted at one end 16.

DESCRIPTION OF THE DRAWINGS

Figure 1:
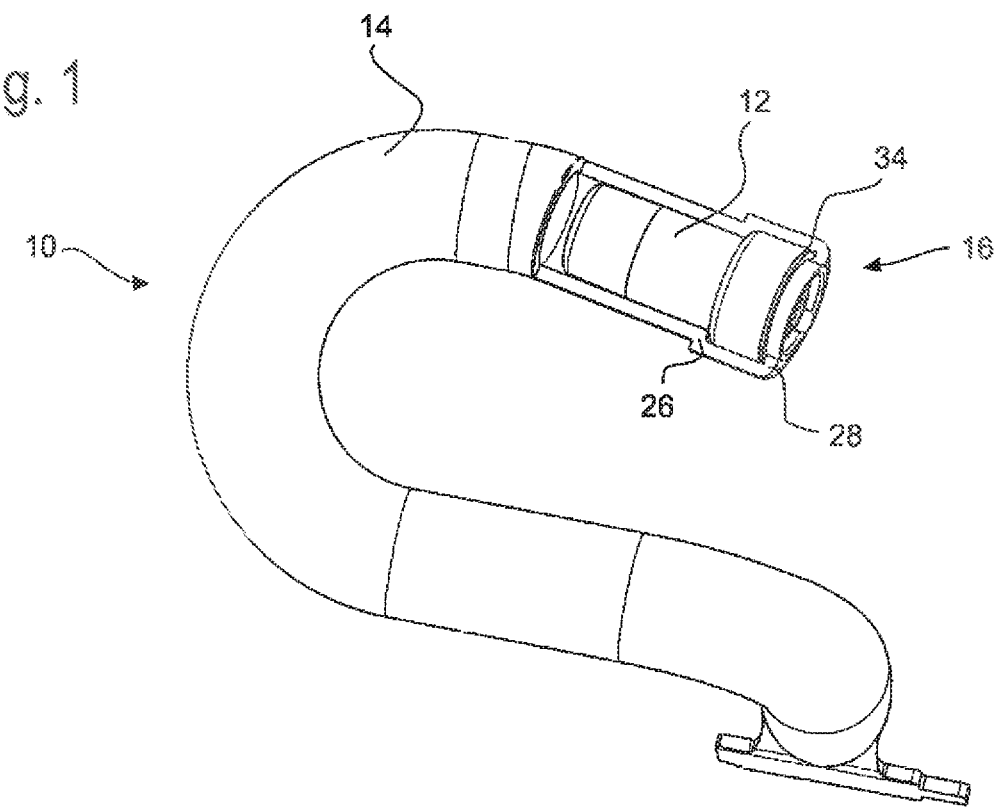
FIG. 1 shows a schematic partly cut view of a subassembly according to the invention in which an Inflator according to the method of the invention is mounted within a tube.
Figure 2:
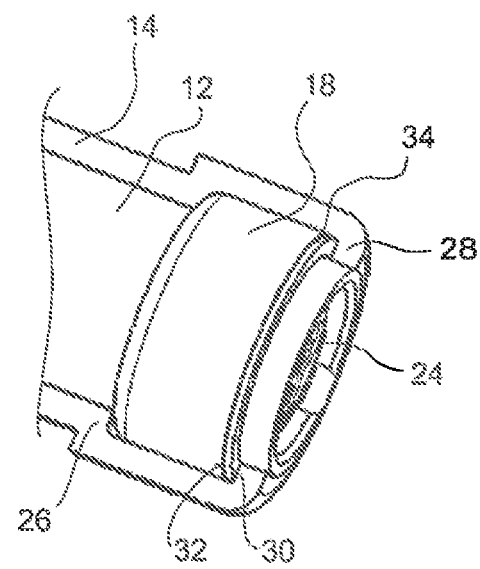
FIG. 2 shows an enlarged cutout from FIG. 1.

The inflator 12 in this case is a micro-inflator and includes a base 18 having an igniter 20 inserted therein which is surrounded by a casing 22 filled with a propelling charge. The casing 22 is fixedly connected to the base 18, the base 18 being wider in the radial direction than the casing 22 and the casing 22 being axially connected to the base 18. At the end of the inflator 12 facing away from the casing 22 a recess 24 in which the electric connections of the inflator 12 are arranged is formed in the base 18.

The inflator 12 is inserted into the end 16 of the tube 14 so far that the base 18 is in contact with a stop 28 inside the tube 14 that prevents any further axial movement.

The base 18 of the inflator 12 is usually made of aluminum while the tube 14 is made of steel.

The end portion 28 of the tube end 16 is crimped radially inwardly and in this case encompasses the base 18 of the inflator 12 along the entire periphery, wherein a first contact surface 30 directed inwardly into the tube 14 is formed at the inner side of the end portion 28.

In this example, at the base 18 of the inflator 12 a second annular contact surface 32 is formed on a circumferential shoulder.

Figure 3:
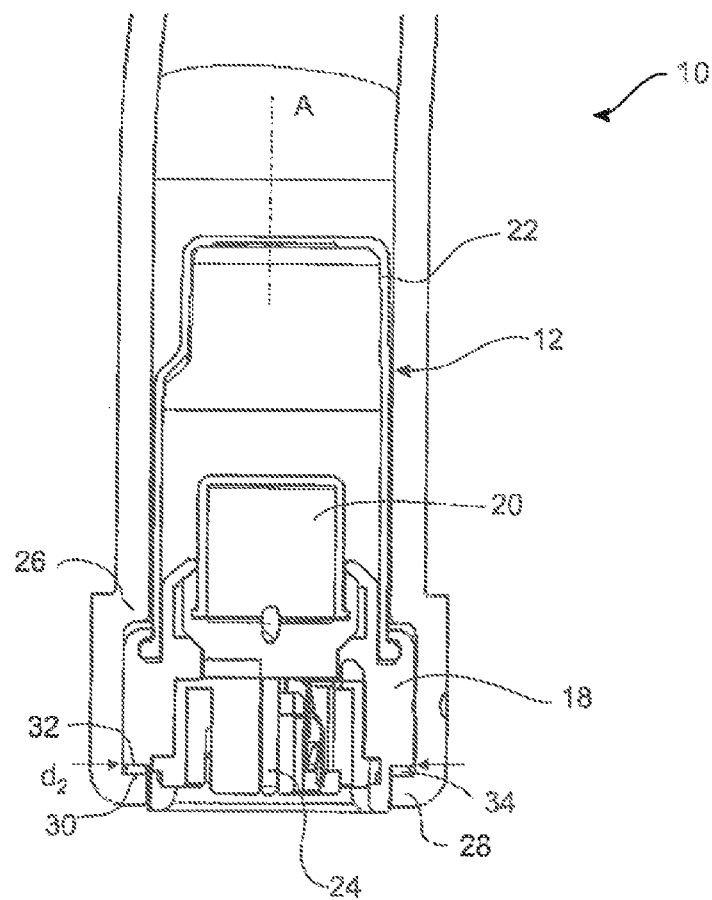
FIG. 3 shows a schematic sectional view of a subassembly according to the invention.
Figure 4:
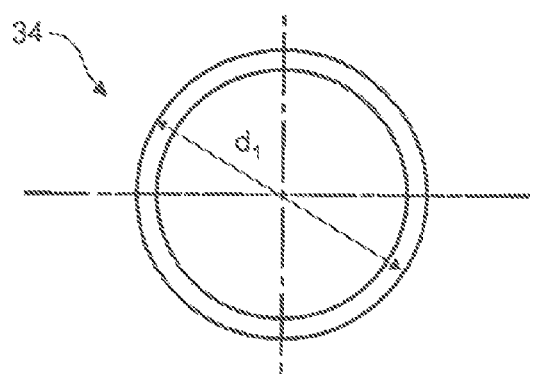
FIG. 4 shows a schematic view of a stabilizing disk for a subassembly according to the invention in a top view.
Figure 5:
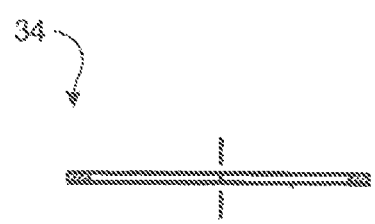
FIG. 5 shows the stabilizing disk from FIG. 4 in a side view.

Both the first contact surface 30 and the second contact surface 32 are aligned perpendicularly to an axial direction A of the tube 14 in the area of the inflator 12 in this case (see FIG. 3).

The first and second contact surfaces 30, 32 are facing each other. Between the contact surfaces 30, 32 an annular stabilizing disk 34 is arranged, the stabilizing disk 34 being adjacent to both the first and the second contact surfaces 30, 32 preferably along the entire periphery thereof.

Here the stabilizing disk 34 is made of steel sheet and has a thickness of about 0.3 to 1 mm, for example.

For mounting the inflator 12 within the tube 14 initially the stabilizing disk 34 is attached to the base 18 of the inflator 12 so that it comes to rest on the second contact surface 32.

The inflator 12 then is inserted into the end 16 of the tube 14 until the axially upper end of the base 18 will be adjacent to the stop 26.

The outer diameter of the stabilizing disk 34 can be chosen to be slightly smaller than the outer diameter of the second contact surface 32 so that the inflator 12 can be seized by a tool at the base 18.

After that, the end portion 28 of the tube 14 is crimped so that the end portion 28 of the tube 14 is adjacent to the stabilizing disk 34 with the first contact surface 30 being formed.

The inflator 12 is fixed substantially free from play in the axial direction A inside the tube 14 between the stop 26 and the first contact surface 30.

Upon ignition of the inflator 12 the gas generated by the latter exits into the tube 14 and drives, for example, an actuating element of a belt tensioner (not shown) arranged inside the tube 14.

The pressure acting on the inwardly formed end portion 28 of the tube 14 is absorbed by the circumferential stabilizing disk 34 and is distributed.

The invention claimed is:

1. A method for mounting an inflator (12) within a tube (14), especially a belt tensioner, wherein an end portion (28) of the tube (14) is formed radially inwardly so that a first contact surface (30) directed into the interior of the tube (14) is formed and prior to forming an annular stabilizing disk (34) is arranged between the first contact surface (30) and a second contact surface (32) configured at the inflator (12).

2. The method according to claim 1, wherein the inflator (12) is inserted into the tube (14) from the direction of the end portion (28).

3. The method according to claim 2, wherein a stop (26) defining an axial position of the inflator (12) within the tube (14) is formed inside the tube (14).

4. The method according to claim 2, wherein the inflator (12) is inserted into the tube (14) by a predetermined fixed dimension.

5. A subassembly comprising an inflator (12) mounted within a tube (14), especially a belt tensioner, in which an annular stabilizing disk (34) is arranged between a first contact surface (30) at a radially inwardly formed end portion (28) of the tube (14) and a second contact surface (32) at the inflator (12).

6. The subassembly according to claim 5, wherein the first and/or second contact surfaces (30, 32) are aligned substantially perpendicularly to an axis (A) of the tube (14).

7. The subassembly according to claim 5, wherein the stabilizing disk (34) is made of steel sheet.

8. The subassembly according to claim 5, wherein the inflator (12) is a micro-inflator.

9. The subassembly according to claim 5, wherein the second contact surface (32) is formed at a base (18) of the inflator (12).

10. The subassembly according to claim 5, wherein an outer diameter ($d_1$) of the stabilizing disk (34) is slightly smaller than an outer diameter ($d_2$) of the second contact surface (32).

* * * * *